United States Patent
Shiraichi et al.

(10) Patent No.: US 9,771,947 B2
(45) Date of Patent: Sep. 26, 2017

(54) CROSS-FLOW FAN, MOLDING DIE, AND FLUID FEEDER

(75) Inventors: Yukishige Shiraichi, Osaka (JP); Masaki Ohtsuka, Osaka (JP)

(73) Assignee: SHARP KABUSHIKI KAISHA, Sakai (JP)

(*) Notice: Subject to any disclaimer, the term of this patent is extended or adjusted under 35 U.S.C. 154(b) by 637 days.

(21) Appl. No.: 14/002,212

(22) PCT Filed: Feb. 28, 2012

(86) PCT No.: PCT/JP2012/054876
§ 371 (c)(1),
(2), (4) Date: Aug. 29, 2013

(87) PCT Pub. No.: WO2012/118057
PCT Pub. Date: Sep. 7, 2012

(65) Prior Publication Data
US 2013/0336793 A1    Dec. 19, 2013

(30) Foreign Application Priority Data
Mar. 2, 2011 (JP) ................. 2011-045180

(51) Int. Cl.
*F04D 29/28* (2006.01)
*B64C 23/00* (2006.01)
(Continued)

(52) U.S. Cl.
CPC ............ *F04D 29/283* (2013.01); *B64C 21/10* (2013.01); *B64C 23/00* (2013.01); *B64C 23/06* (2013.01);
(Continued)

(58) Field of Classification Search
CPC ........ F04D 17/04; F04D 29/30; F04D 29/667; F04D 29/663; F04D 29/666; F04D 29/66;
(Continued)

(56) References Cited

U.S. PATENT DOCUMENTS

| 4,876,070 A * | 10/1989 | Tsukahara ............... A01N 25/34 210/501 |
| 5,114,657 A * | 5/1992 | Miyajima ........... B29C 33/0033 249/145 |

(Continued)

FOREIGN PATENT DOCUMENTS

| JP | 59-62293 U | 4/1984 |
| JP | 6-229395 A | 8/1994 |

(Continued)

OTHER PUBLICATIONS

Official Communication issued in International Patent Application No. PCT/JP2012/054876, mailed on May 22, 2012.

*Primary Examiner* — Mark Laurenzi
*Assistant Examiner* — Wesley Harris
(74) *Attorney, Agent, or Firm* — Keating & Bennett, LLP

(57) ABSTRACT

A cross-flow fan includes a plurality of fan blades provided to be circumferentially spaced apart from each other. The fan blade has an inner edge portion arranged on the radially inner side to/from which air flows in/out, and an outer edge portion arranged on the radially outer side to/from which air flows in/out. Fan blade has a blade surface extending between the inner edge portion and the outer edge portion. The blade surface includes a pressure surface arranged on the rotation direction side of the cross-flow fan and a suction surface arranged on the back side of the pressure surface. When cut along a plane orthogonal to the rotation axis of the cross-flow fan, the fan blade has a blade cross-sectional shape in which a concave portion concave from the pressure surface is formed.

6 Claims, 13 Drawing Sheets

(51) Int. Cl.
 F04D 29/66 (2006.01)
 F24F 1/00 (2011.01)
 B64C 23/06 (2006.01)
 F24F 13/24 (2006.01)
 B64C 21/10 (2006.01)
 F04D 17/04 (2006.01)
 F04D 29/30 (2006.01)

(52) U.S. Cl.
 CPC ............ *F04D 17/04* (2013.01); *F04D 29/282* (2013.01); *F04D 29/30* (2013.01); *F04D 29/66* (2013.01); *F04D 29/663* (2013.01); *F04D 29/666* (2013.01); *F04D 29/667* (2013.01); *F24F 1/00* (2013.01); *F24F 1/0025* (2013.01); *F24F 13/24* (2013.01); *B64C 2230/26* (2013.01); *F05B 2240/301* (2013.01); *F24F 2001/0048* (2013.01); *Y02T 50/166* (2013.01); *Y02T 70/121* (2013.01)

(58) Field of Classification Search
 CPC ............... F04D 29/283; F24F 1/0025; F24F 2001/0048; F24F 1/00; F24F 13/24; B64C 21/10; B64C 2230/26; B64C 23/00; B64C 23/06; Y02T 50/166; Y02T 70/121; F05B 2240/301

USPC ....... 415/53.1–53.3; 416/178, 187, 228, 235, 416/236 R, 236 A
See application file for complete search history.

(56) References Cited

U.S. PATENT DOCUMENTS

| 5,169,290 | A | * | 12/1992 | Chou | ...................... | F01D 5/145 |
| | | | | | | 416/223 B |
| 7,794,198 | B2 | * | 9/2010 | Omori | ...................... | F04D 29/30 |
| | | | | | | 415/119 |
| 2008/0181764 | A1 | * | 7/2008 | Hirakawa | ............... | F04D 17/04 |
| | | | | | | 415/53.2 |
| 2009/0028719 | A1 | * | 1/2009 | Teraoka | .................. | F04D 17/04 |
| | | | | | | 416/223 R |
| 2010/0322779 | A1 | | 12/2010 | Nakagawa et al. | | |
| 2011/0318189 | A1 | | 12/2011 | Teraoka et al. | | |

FOREIGN PATENT DOCUMENTS

| JP | 8-261197 A | 10/1996 |
| JP | 2005-233126 A | 9/2005 |
| JP | 2007-10259 A | 1/2007 |
| JP | 2007-21352 A | 2/2007 |
| JP | 2008-157113 A | 7/2008 |
| JP | 2009-36187 A | 2/2009 |
| JP | 2010-127565 A | 6/2010 |
| JP | 2010-236540 A | 10/2010 |

* cited by examiner

CROSS-FLOW FAN, MOLDING DIE, AND FLUID FEEDER

TECHNICAL FIELD

The present invention relates to a cross-flow fan, a molding die, and a fluid feeder, and particularly to a cross-flow fan for an air conditioner and an air purifier, a molding die for use in production of the cross-flow fan, and a fluid feeder provided with the cross-flow fan.

BACKGROUND ART

As for conventional cross-flow fans, for example, Japanese Patent Laying-Open No. 2007-21352 discloses an air purifier which aims to reduce the installation area while increasing the blowing capacity (PTD 1). In the air purifier disclosed in PTD 1, a vertically long cross-flow fan driven by a motor is arranged in a body having an intake and an outlet at left and right ends, respectively.

Other documents that disclose conventional fans include Japanese Patent Laying-Open No. 8-261197 (PTD 2), Japanese Utility Model Laying-Open No. 59-62293 (PTD 3), Japanese Patent Laying-Open No. 2009-36187 (PTD 4), Japanese Patent Laying-Open No. 2008-157113 (PTD 5), and Japanese Patent Laying-Open No. 2005-233126 (PTD 6).

CITATION LIST

Patent Document

PTD 1: Japanese Patent Laying-Open No. 2007-21352
PTD 2: Japanese Patent Laying-Open No. 8-261197
PTD 3: Japanese Utility Model Laying-Open No. 59-62293
PTD 4: Japanese Patent Laying-Open No. 2009-36187
PTD 5: Japanese Patent Laying-Open No. 2008-157113
PTD 6: Japanese Patent Laying-Open No. 2005-233126

SUMMARY OF INVENTION

Technical Problem

In recent years, for conservation of global environment, further energy savings in home electric equipment are desired. For example, it is known that the efficiency of electric equipment such as an air conditioner and an air purifier greatly depends on the efficiency of a blower included therein. It is also known that reducing the weight of a fan blade provided as a rotating body in a blower reduces power consumption of a motor for rotatably driving the fan blade and improves the efficiency of the blower or a fluid feeder.

However, an aerofoil employed as the shape in cross section of a fan blade is essentially assumed to be applied to the wing of an air plane and is mainly found in the field of aeronautical engineering. Therefore, an aerofoil fan blade is mainly optimized in a high Reynolds number region and is not always appropriate as the cross section of a fan blade used in a low Reynolds number region for an air conditioner, an air purifier, etc. for home use.

When an aerofoil or double arc is employed as the cross-sectional shape of a fan blade, a thick portion exists in a range of 30 to 50% from the front edge of the fan blade. This increases the weight of the fan blade, which becomes a cause of increased friction loss during rotation. However, simply reducing the weight of a fan blade may reduce the strength of the fan blade and result in fracture or other poor quality.

For the reasons above, in order to save energy in electric equipment such as an air conditioner and an air purifier for home use, an appropriate blade cross-sectional shape has been sought for a fan blade to be used in the low Reynolds number region. A blade cross-sectional shape with a high lift-drag ratio, a small thickness and weight, and a high strength has also been sought.

Fans for use in an air blower include a cross-flow fan that forms an outlet flow in the form of a flat plane parallel to the rotation axis of the fan. Examples of typical application of the cross-flow fan include an air conditioner. Reducing power consumption of an air conditioner is a high priority when more energy savings in home electric equipment are desired. There is a demand to increase air flow rate for the purpose of reducing power consumption of the air conditioner. The increase of air flow rate can increase the performance of evaporation and condensation of a heat exchanger and can reduce power consumption of a compressor, accordingly. However, the increase of air flow rate increases power consumption of the fan. Therefore, the balance between the reduction of power consumption in the compressor and the increase of power consumption in the fan amounts to a reduction of power consumption. Thus, the effect achieved by increasing the air flow rate of the fan cannot be maximized. On the other hand, if the rotation speed is increased with the same fan, as a means for increasing the air flow rate of the fan, the noise of the air conditioner is increased.

Another example of application of the cross-flow fan is an air purifier. An air purifier is requested to increase its dust-collecting capacity, that is, to increase the air flow rate, and to reduce noise. However, there is a tradeoff between these two requests.

In order to satisfy these two, it is necessary not only to reduce noise from the intake and the outlet of the air purifier but also to fundamentally reduce noise of the cross-flow fan that blows air. In order to increase the air flow rate, it is necessary to increase the rotation speed of the cross-flow fan. When the rotation speed of the cross-flow fan is increased, it is necessary to reduce input to the fan. It is also necessary to increase the strength of the fan blade to such an extent as to overcome the increased centrifugal force caused by the increased rotation speed of the cross-flow fan.

An object of the present invention is therefore to solve the aforementioned problems and to provide a cross-flow fan exhibiting an excellent blowing capacity, a molding die for use in production of the cross-flow fan, and a fluid feeder provided with the cross-flow fan.

Solution to Problem

A cross-flow fan according to the present invention includes a plurality of vane portions provided to be circumferentially spaced apart from each other. The vane portion has an inner edge portion arranged on a radially inner side to/from which air flows in/out and an outer edge portion arranged on a radially outer side to/from which air flows in/out. The vane portion has a blade surface extending between the inner edge portion and the outer edge portion. The blade surface includes a pressure surface arranged on a rotation direction side of the cross-flow fan and a suction surface arranged on a back side of the pressure surface. When cut along a plane orthogonal to a rotation axis of the cross-flow fan, the vane portion has a blade cross-sectional shape in which a concave portion concave from the pressure surface is formed.

In the cross-flow fan configured in this manner, during rotation of the cross-flow fan, an air flow that flows in from the outer edge portion, passes through the blade surface, and flows out from the inner edge portion and an air flow that flows in from the inner edge portion, passes through the blade surface, and flows out from the outer edge portion are alternately produced in each vane portion. Here, a vortex (secondary flow) of air flow is generated in the concave portion formed to be concave from the pressure surface, so that the air flow (main flow) passing through the pressure surface flows along the outside of the vortex produced in the concave portion. Accordingly, the vane portion exhibits a behavior like a thick blade as if a blade cross sectional shape is increased in thickness by the amount of formation of the vortex. As a result, the blowing capacity of the cross-flow fan can be improved.

Preferably, when cut along the plane orthogonal to the rotation axis of the cross-flow fan, the vane portion has a blade cross-sectional shape in which the concave portion is formed only at the pressure surface, of the pressure surface and the suction surface.

In the cross-flow fan configured in this manner, on the pressure surface side at which the main flow of air flow is strongly pressed against the blade surface, the friction drag between the main flow and the blade surface is reduced by the vortex formed in the concave portion, while on the suction surface side at which force is exerted in the direction in which the main flow of air flow is stripped from the blade surface, it is avoided that the vortex formed in the concave portion causes the stripping of the main flow.

Preferably, the concave portion has a groove cross section extending along the rotation axis of the cross-flow fan. A side surface of the groove cross section is formed so as to rise from a point where a depth of the concave portion is greatest, toward opposite sides thereof. In the cross-flow fan configured in this manner, the vortex formed in the concave portion is more protuberant from the blade surface. In this case, the main flow of air flow flows outside the protuberant vortex, thereby achieving the effect of a thick blade more effectively.

Preferably, the vane portion has a flection portion formed by flexing a center line of the blade cross-sectional shape extending between the inner edge portion and the outer edge portion. The concave portion is formed at the flection portion. In the cross-flow fan configured in this manner, a concave portion concave from the pressure surface is formed by providing a flection portion in the vane portion.

Preferably, the concave portion is formed in the proximity of the inner edge portion and the outer edge portion. In the cross-flow fan configured in this manner, the above-noted effect achieved by the concave portion is brought about in the proximity of the inner edge portion and the outer edge portion, thereby generating a high lift.

Preferably, the concave portion is formed at a blade central portion between the inner edge portion and the outer edge portion. In the cross-flow fan configured in this manner, the above-noted effect achieved by the concave portion is brought about in the blade central portion, so that the vane portion exhibits a stable capacity as a blade.

Preferably, the concave portion is formed to extend from one end to the other end of the blade surface in a rotation axis direction of the cross-flow fan. In the cross-flow fan configured in this manner, a vortex of air flow is generated in the concave portion formed to extend from one end to the other end of the blade surface in the rotation axis direction of the cross-flow fan, thereby improving the blowing capacity of the cross-flow fan more effectively.

Preferably, the concave portion is formed at the pressure surface so as to repeatedly appear in a direction in which the inner edge portion is connected with the outer edge portion. In the cross-flow fan configured in this manner, a vortex of air flow is generated in the concave portion which repeatedly appears at the pressure surface, thereby improving the blowing capacity of the cross-flow fan more effectively.

Preferably, when cut along the plane orthogonal to the rotation axis of the cross-flow fan, the vane portion has a blade cross-sectional shape in which a plurality of the concave portions concave from the pressure surface are formed. In the cross-flow fan configured in this manner, vortexes are formed in a plurality of concave portions, thereby improving the blowing capacity of the cross-flow fan more effectively.

Preferably, the cross-flow fan is formed from resin. In the cross-flow fan configured in this manner, a light and high-strength cross-flow fan made of resin can be obtained.

A molding die according to the present invention is used to mold the cross-flow fan as described above. With the molding die configured in this manner, a light and high-strength cross-flow fan made of resin can be manufactured.

A fluid feeder according to the present invention includes a blower configured to include any of the cross-flow fan as described above and a driving motor coupled to the cross-flow fan to rotate a plurality of vane portions. In the fluid feeder configured in this manner, power consumption of the driving motor can be reduced while the blowing capacity is kept high.

Advantageous Effects of Invention

As described above, the present invention provides a cross-flow fan exhibiting an excellent blowing capacity, a molding die for use in production of the cross-flow fan, and a fluid feeder provided with the cross-flow fan.

DESCRIPTION OF EMBODIMENTS

Figure 1:
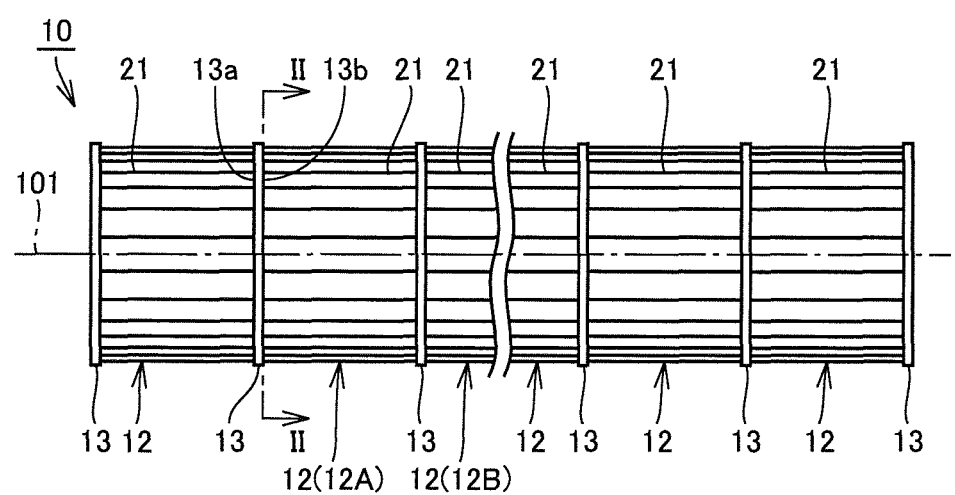
FIG. 1 is a side view of a cross-flow fan in a first embodiment of the present invention.

Embodiments of the present invention will be described with reference to the figures. In the following, the same or corresponding members in the figures are denoted with the same reference numerals.

First Embodiment

Figure 2:
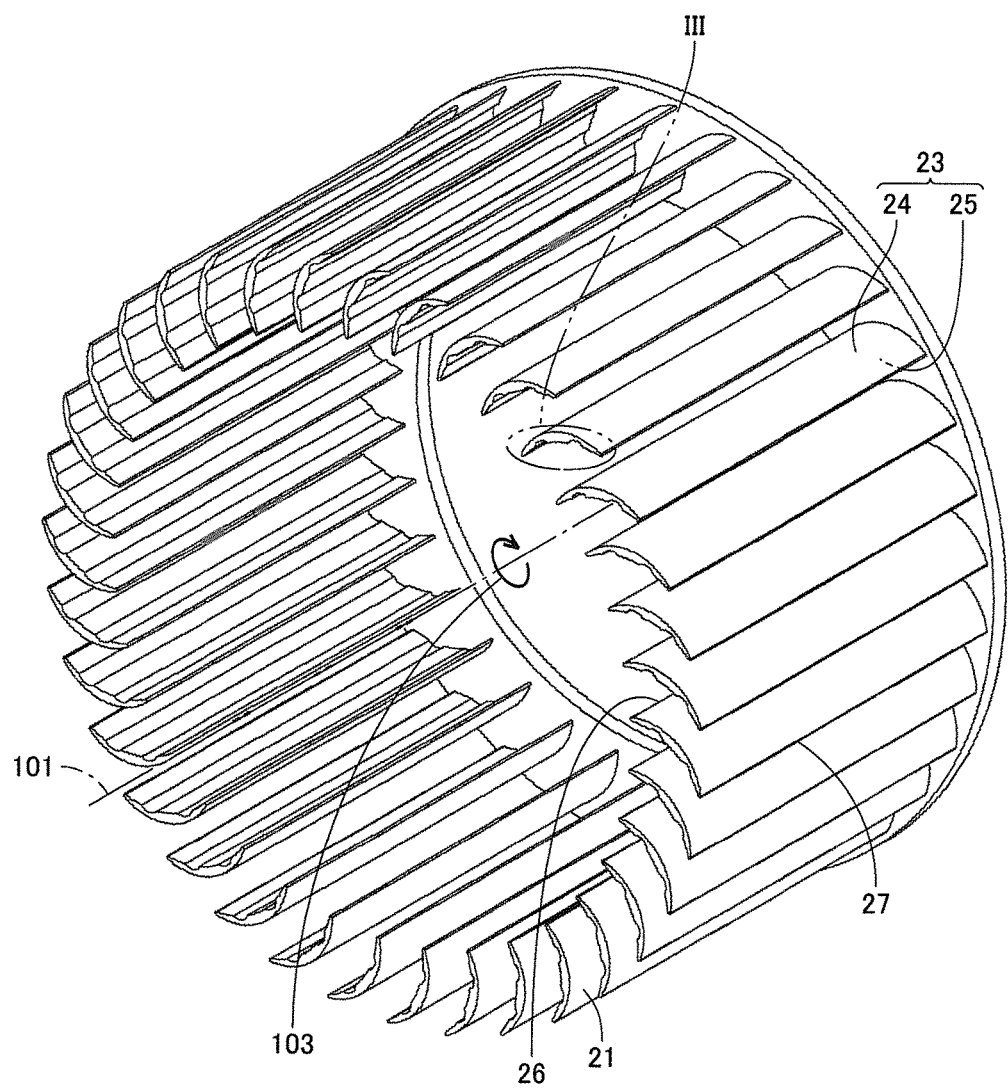
FIG. 2 is a cross-sectional perspective view of the cross-flow fan taken along a line II-II in FIG. 1.

FIG. 1 is a side view of a cross-flow fan in a first embodiment of the present invention. FIG. 2 is a cross-sectional perspective view of the cross-flow fan taken along a line II-II in FIG. 1.

Referring to FIG. 1 and FIG. 2, a cross-flow fan 10 in the present embodiment has a plurality of fan blades 21. Cross-flow fan 10 has an approximately cylindrical appearance as a whole. A plurality of fan blades 21 are arranged on a side surface of the approximately cylindrical shape. Cross-flow fan 10 is integrally formed from resin. Cross-flow fan 10 rotates in the direction shown by an arrow 103 around an imaginary center axis 101 shown in the figures.

Cross-flow fan 10 is a fan using a plurality of rotating fan blades 21 to flow air in a direction orthogonal to center axis 101 serving as the rotation axis. As viewed from the axial direction of center axis 101, cross-flow fan 10 takes in air from an outside space on one side with respect to center axis 101 to an inside space of the fan and blows the taken-in air to the outside space on the other side with respect to center axis 101. Cross-flow fan 10 forms an air flow that flows in the direction crossing center axis 101 in a flat plane orthogonal to center axis 101. Cross-flow fan 10 forms an outlet flow in the form of a flat plane parallel to center axis 101.

Cross-flow fan 10 is used with the rotation speeds in the low Reynolds number region applied to a fan for home electric equipment, etc.

Cross-flow fan 10 is configured such that a plurality of impellers 12 aligned in the axial direction of center axis 101 are combined. In each impeller 12, a plurality of fan blades 21 are provided to be circumferentially spaced apart from each other around center axis 101.

Cross-flow fan 10 further has a peripheral frame 13 serving as a support. Peripheral frame 13 has a ring shape annularly extending around center axis 101. Peripheral frame 13 has an end surface 13a and an end surface 13b. End surface 13a is formed to face one direction along the axial direction of center axis 101. End surface 13b is arranged on the back side of end surface 13a and is formed to face the other direction along the axial direction of center axis 101.

Peripheral frame 13 is provided to be interposed between impellers 12 adjacent to each other in the axial direction of center axis 101.

With attention given to impeller 12A and impeller 12B in FIG. 1 arranged adjacent to each other, a plurality of fan blades 21 provided in impeller 12A are provided to stand on end surface 13a and are formed to extend like a plate along the axial direction of center axis 101. A plurality of fan blades 21 provided in impeller 12B are provided to stand on end surface 13b and are formed to extend like a plate along the axial direction of center axis 101.

A plurality of fan blades 21 have a shape equal to each other. In the present embodiment, a plurality of fan blades 21 are arranged at a random pitch in the circumferential direction around center axis 101.

Fan blade 21 has an inner edge portion 26 and an outer edge portion 27. Inner edge portion 26 is arranged on an end portion at a radially inner side of fan blade 21. Outer edge portion 27 is arranged at an end portion at a radially outer side of fan blade 21. Fan blade 21 is formed to be inclined in the circumferential direction around center axis 101 from inner edge portion 26 toward outer edge portion 27. Fan blade 21 is formed to be inclined in the rotation direction of cross-flow fan 10 from inner edge portion 26 toward outer edge portion 27.

Fan blade 21 has a blade surface 23 including a pressure surface 25 and a suction surface 24. Pressure surface 25 is arranged on the rotational direction side of cross-flow fan 10. Suction surface 24 is arranged on the back side of pressure surface 25. During rotation of cross-flow fan 10, as an air flow is produced on blade surface 23, a pressure distribution is generated such that pressure is relatively large at pressure surface 25 and is relatively small at suction surface 24. Fan blade 21 has a shape generally curved between inner edge portion 26 and outer edge portion 27 so as to be concave on the pressure surface 25 side and be convex on the suction surface 24 side.

Figure 3:
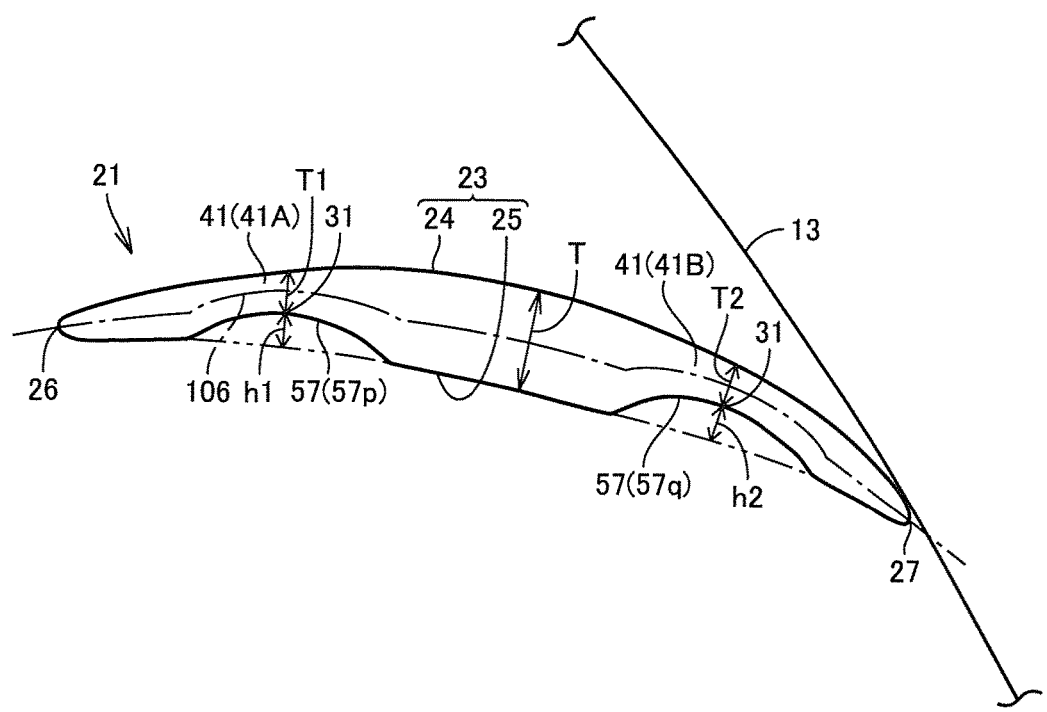
FIG. 3 is a cross-sectional view of a fan blade provided in the cross-flow fan in FIG. 1.

FIG. 3 is a cross-sectional view of the fan blade provided in the cross-flow fan in FIG. 1. FIG. 3 shows a blade cross-sectional shape of fan blade 21 when it is cut along a plane orthogonal to center axis 101 serving as the rotation axis of cross-flow fan 10.

Referring to FIG. 1 to FIG. 3, fan blade 21 is formed to have the same blade cross-sectional shape when it is cut at any place in the axial direction of center axis 101. Fan blade 21 has a blade cross-sectional shape as a whole in which the thickness (the length between pressure surface 25 and suction surface 24) is relatively small at positions adjacent to inner edge portion 26 and outer edge portion 27 and the thickness gradually increases toward the blade central portion between inner edge portion 26 and outer edge portion 27.

Fan blade 21 has a blade cross-sectional shape in which a concave portion 57 is formed at pressure surface 25 of blade surface 23. Concave portion 57 is formed so as to be concave from pressure surface 25. Concave portion 57 is formed so as to be concave from pressure surface 25 extending to be curved between inner edge portion 26 and outer edge portion 27. Assuming that pressure surface 25 extends to be continuously curved between inner edge portion 26 and outer edge portion 27, concave portion 57 makes pressure surface 25 discontinuous at a position where concave portion 57 is formed. Concave portion 57 is formed at a distance from inner edge portion 26 and outer edge portion 27 toward the blade central portion.

Concave portion 57 is formed only at pressure surface 25, of pressure surface 25 and suction surface 24. In other words, no concave portion is formed at suction surface 24. Suction surface 24 extends to be continuously curved between inner edge portion 26 and outer edge portion 27.

In the cross section shown in FIG. 3, concave portion 57 has a groove cross section extending along the axial direction of center axis 101. The groove cross section of concave portion 57 is formed to continuously extend between one end and the other end of fan blade 21 in the axial direction of center axis 101. The groove cross section of concave portion 57 is formed to linearly extend between one end and the other end of fan blade 21 in the axial direction of center axis 101. The groove cross section of concave portion 57 is formed to extend from one end to the other end of blade surface 23 in the axial direction of center axis 101.

The side surface of the groove cross section of concave portion 57 is formed so as to rise from a point 31 where the depth h1, h2 of concave portion 57 is greatest, toward opposite sides thereof. The side surface of the groove cross section of concave portion 57 is formed of a curved surface as a whole. The side surface of the groove cross section of concave portion 57 is formed so as not to have a flat portion at the bottom thereof. Concave portion 57 has a U-shaped groove cross section.

In the present embodiment, a plurality of concave portions 57 (concave portion 57p and concave portion 57q) are formed at pressure surface 25. Concave portions 57 are formed in the proximity of inner edge portion 26 and outer edge portion 27. More specifically, concave portion 57p is formed in the proximity of inner edge portion 26, and concave portion 57q is formed in the proximity of outer edge portion 27. Concave portion 57p is formed at a position closer to inner edge portion 26 than the blade central portion between inner edge portion 26 and outer edge portion 27. Concave portion 57q is formed at a position closer to outer edge portion 27 than the blade central portion between inner edge portion 26 and outer edge portion 27.

FIG. 3 shows a center line 106 in the thickness direction (the direction in which pressure surface 25 is connected with suction surface 24) of the blade cross-sectional shape of fan blade 21. Fan blade 21 has inner edge portion 26 at the front end of center line 106 extending toward the radially inner side and has outer edge portion 27 at the front end of center line 106 extending toward the radially outer side.

Thickness T of the blade cross-sectional shape of fan blade 21 gradually increases from inner edge portion 26 toward outer edge portion 27 along center line 106 and decreases in turn when reaching concave portion 57p. Thickness T of the blade cross-sectional shape of fan blade 21 gradually increases from outer edge portion 27 toward inner edge portion 26 along center line 106 and decreases in turn when reaching concave portion 57q. Concave portion 57 is formed such that thickness T1 of fan blade 21 at the position where concave portion 57p is formed and thickness T2 of fan blade 21 at the position where concave portion 57q is formed are equal to each other. In FIG. 3, the positions where concave portions 57 are formed are determined based on points 31 where the depths h1, h2 of concave portions 57 are greatest.

Fan blade 21 has a flection portion 41 formed by flexing center line 106 of the blade cross-sectional shape of fan blade 21 between inner edge portion 26 and outer edge portion 27. Concave portion 57 is formed at flection portion 41. Flection portion 41 is flexed so as to be convex toward the suction surface 24 at the position where concave portion 57 is formed. In the present embodiment, fan blade 21 has two flection portions 41 between inner edge portion 26 and outer edge portion 27. Fan blade 21 has a flection portion 41A arranged in the proximity of inner edge portion 26 and flection portion 41B arranged in the proximity of outer edge portion 27. Flection portion 41A forms concave portion 57p at pressure surface 25, and flection portion 41B forms concave portion 57q at pressure surface 25.

The structure of cross-flow fan 10 in the first embodiment of the present invention as described above is summarized as follows. Cross-flow fan 10 in the present embodiment includes a plurality of fan blades 21 as vane portions provided to be circumferentially spaced apart from each other. Fan blade 21 has inner edge portion 26 arranged on the radially inner side to/from which air flows in/out and outer edge portion 27 arranged on the radially outer side to/from which air flows in/out. Fan blade 21 has blade surface 23 extending between inner edge portion 26 and outer edge portion 27. Blade surface 23 includes pressure surface 25 arranged on the rotation direction side of cross-flow fan 10 and suction surface 24 arranged on the back side of pressure surface 25. When cut along the plane orthogonal to the rotation axis of centrifugal fan 10, fan blade 21 has a blade cross-sectional shape in which concave portion 57 concave from pressure surface 25 is formed.

A structure of an air conditioner using cross-flow fan 10 in FIG. 1 will now be described.

Figure 4:
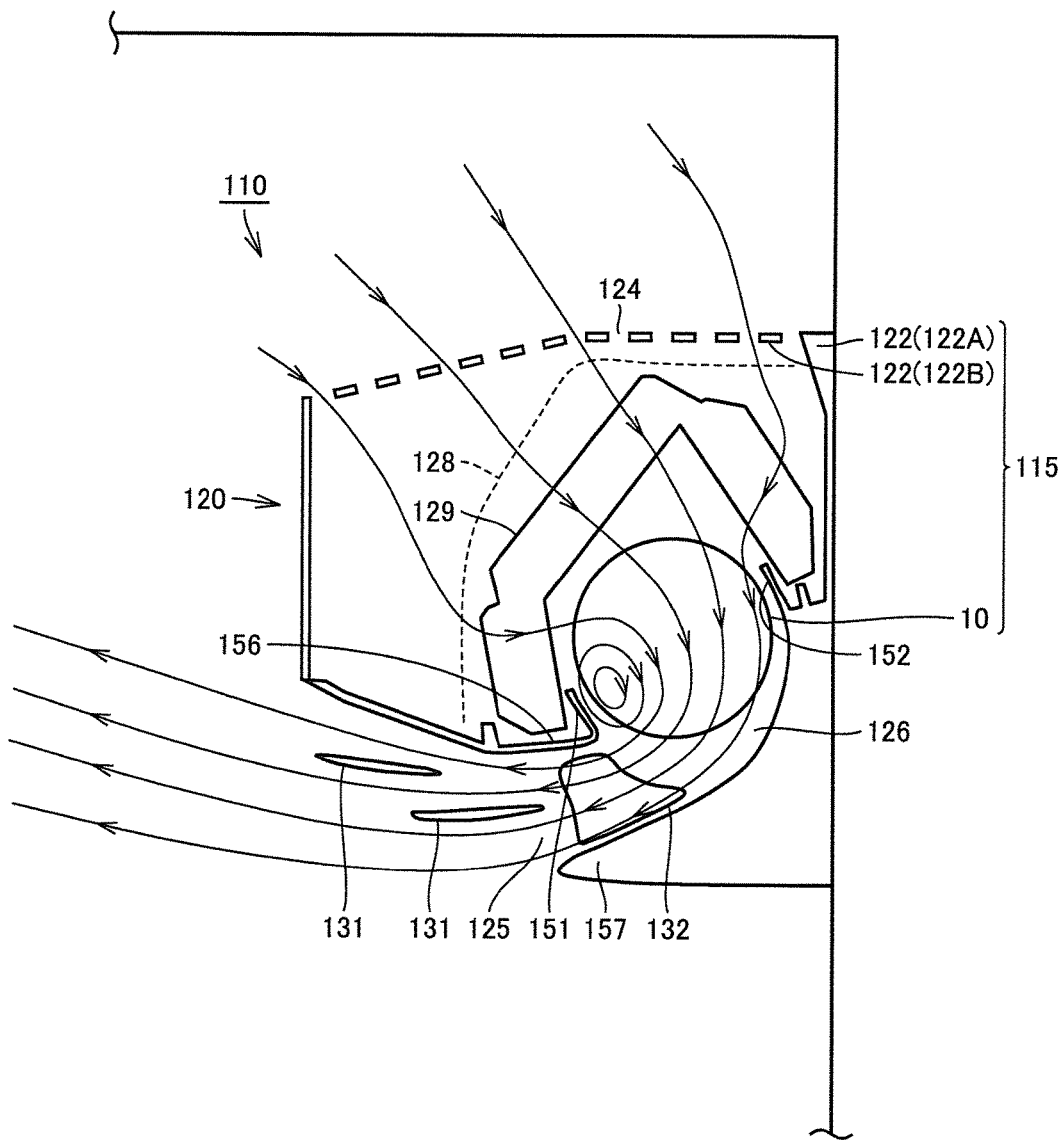
FIG. 4 is a cross-sectional view of an air conditioner using the cross-flow fan shown in FIG. 1.

FIG. 4 is a cross-sectional view of an air conditioner using the cross-flow fan shown in FIG. 1. Referring to FIG. 4, an air conditioner 110 is configured with an indoor unit 120 installed in a room and provided with an indoor heat exchanger 129 and a not-shown outdoor unit installed in the outside of the room and provided with an outdoor heat exchanger and a compressor. Indoor unit 120 and the outdoor unit are connected by piping for circulating refrigerant gas between indoor heat exchanger 129 and the outdoor heat exchanger.

Indoor unit 120 has a blower 115. Blower 115 is configured to include cross-flow fan 10, a not-shown driving motor for rotating cross-flow fan 10, and a casing 122 for producing a prescribed airflow with rotation of cross-flow fan 10.

Casing 122 has a cabinet 122A and a front panel 122B. Cabinet 122A is supported on a wall surface in the room. Front panel 122B is removably attached to cabinet 122A. An outlet port 125 is formed in a gap between a lower end portion of front panel 122B and a lower end portion of cabinet 122A. Outlet port 125 is formed in an approximately rectangular shape extending in the width direction of indoor unit 120 and is provided to be directed forward and downward. On the top surface of front panel 122B, a grid-like intake port 124 is formed.

At a position opposing front panel 122B, an air filter 128 is provided for collecting and removing dust included in the air taken in from intake port 124. A not-shown air filter cleaner is provided in a space formed between front panel 122B and air filter 128. The air filter cleaner automatically removes dust accumulated in air filter 128.

In the inside of casing 122, an air flow channel 126 is formed, through which air is circulated from intake port 124 toward outlet port 125. Outlet portion 125 is provided with a vertical louver 132 that can change the blowing angle in the left and right directions and a plurality of horizontal louvers 131 that can change the blowing angle in the up and down directions to a forward-upward direction, a horizontal direction, a forward-downward direction, and an immediately downward direction.

Indoor heat exchanger 129 is arranged between cross-flow fan 10 and air filter 128 on a path of air flow channel 126. Indoor heat exchanger 129 has not-shown serpentine refrigerant pipes arranged side by side in a plurality of layers in the up and down directions and in a plurality of columns in the front and back directions. Indoor heat exchanger 129 is connected to the compressor of the outdoor unit installed in the outdoor, and the compressor is driven to operate a refrigeration cycle. Through the operation of the refrigeration cycle, indoor heat exchanger 129 is cooled to a temperature lower than the ambient temperature during cooling operation, and indoor heat exchanger 129 is heated to a temperature higher than the ambient temperature during heating operation.

Figure 5:
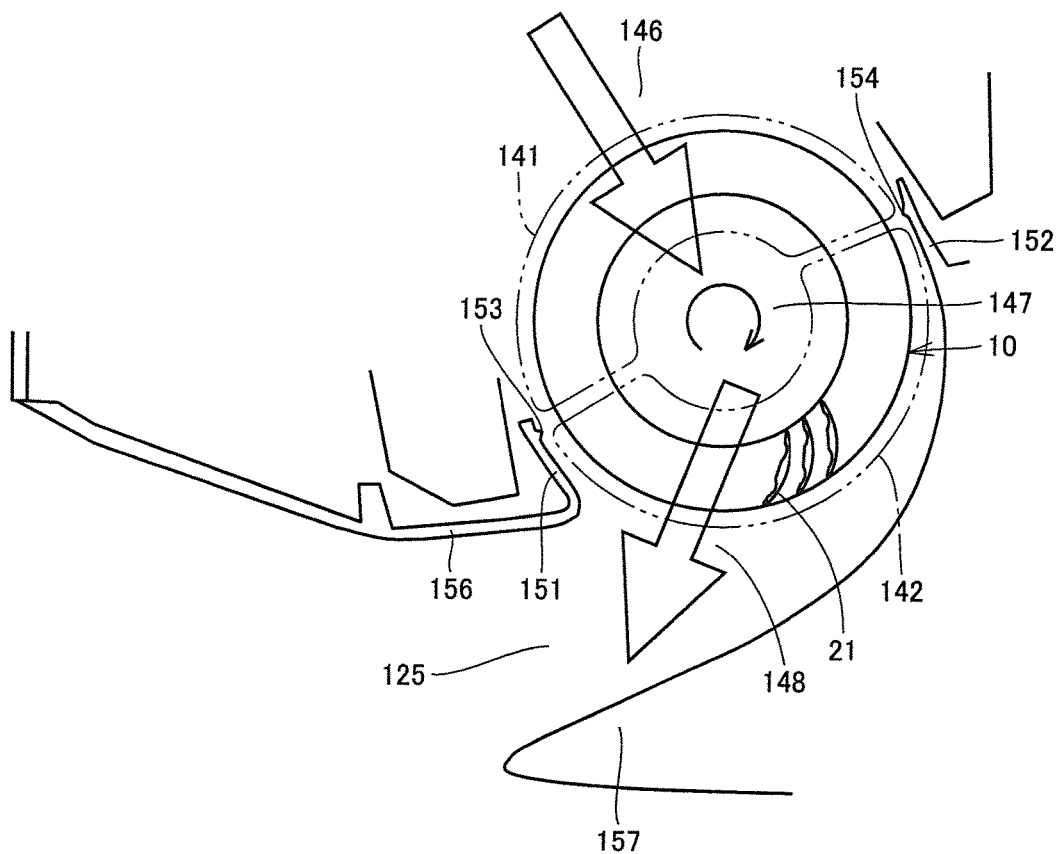
FIG. 5 is an enlarged cross-sectional view showing the proximity of an outlet port of the air conditioner in FIG. 4.

FIG. 5 is an enlarged cross-sectional view showing the proximity of the outlet port of the air conditioner in FIG. 4. Referring to FIG. 4 and FIG. 5, casing 122 has a front wall portion 151 and a rear wall portion 152. Front wall portion 151 and rear wall portion 152 are arranged to face each other at a distance from each other.

On a path of air flow channel 126, cross-flow fan 10 is arranged to be positioned between front wall portion 151 and rear wall portion 152. A protrusion portion 153 is formed at front wall portion 151 to protrude toward the radially outer surface of cross-flow fan 10 so as to decrease the gap between cross-flow fan 10 and front wall portion 151. A protrusion portion 154 is formed at rear wall portion 152 to protrude toward the radially outer surface of cross-flow fan 10 so as to decrease the gap between cross-flow fan 10 and rear wall portion 152.

Casing 122 has an upper guide portion 156 and a lower guide portion 157. Air flow channel 126 is defined by upper guide portion 156 and lower guide portion 157 on the downstream side of air flow from cross-flow fan 10.

Upper guide portion 156 and lower guide portion 157 are continuous from front wall portion 151 and rear wall portion 152, respectively, and extend toward outlet port 125. Upper guide portion 156 and lower guide portion 157 are formed to curve the air blown by cross-flow fan 10 such that upper guide portion 156 is the inner circumferential side and lower guide portion 157 is the outer circumferential side, and to guide the air forward and downward. Upper guide portion 156 and lower guide portion 157 are formed such that the cross section of air flow channel 126 increases from cross-flow fan 10 toward outlet port 125.

In the present embodiment, front wall portion 151 and upper guide portion 156 are integrally formed with front panel 122B. Rear wall portion 152 and lower guide portion 157 are integrally formed with cabinet 122A.

Figure 6:
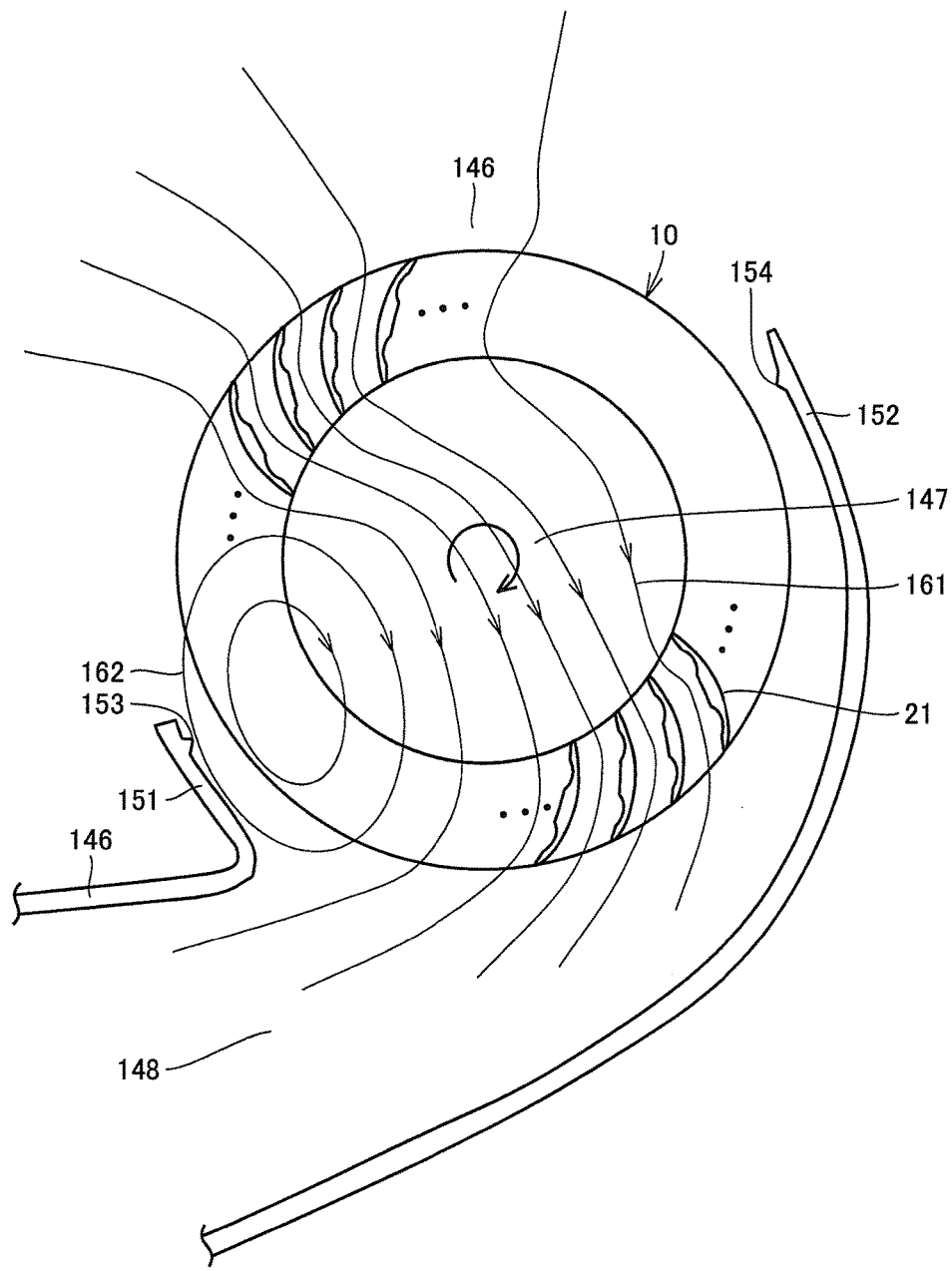
FIG. 6 is a cross-sectional view of an air flow produced in the proximity of the outlet port of the air conditioner in FIG. 4.

FIG. 6 is a cross-sectional view of an air flow produced in the proximity of the outlet port of the air conditioner in FIG. 4. Referring to FIG. 5 and FIG. 6, on the path on air flow channel 126, an upstream outside space 146 is formed to be positioned upstream of air flow from cross-flow fan 10, an inside space 147 is formed to be positioned in the inside of cross-flow fan 10 (the radially inner side of a plurality of fan blades 21 circumferentially arranged), and a downstream outside space 148 is formed to be positioned downstream of air flow from cross-flow fan 10.

During rotation of cross-flow fan 10, at an upstream region 141 of air flow channel 126 with respect to protrusion portions 153, 154 as a boundary, an air flow 161 is formed to pass through on blade surface 23 of fan blade 21 from upstream outside space 146 toward inside space 147. At a downstream region 142 of air flow channel 126 with respect to protrusion portions 153, 154 as a boundary, air flow 161 is formed to pass through on blade surface 23 of fan blade 21 from inside space 147 toward downstream outside space 148. Here, at a position adjacent to front wall portion 151, a vortex 162 of air flow is formed.

Figure 7:
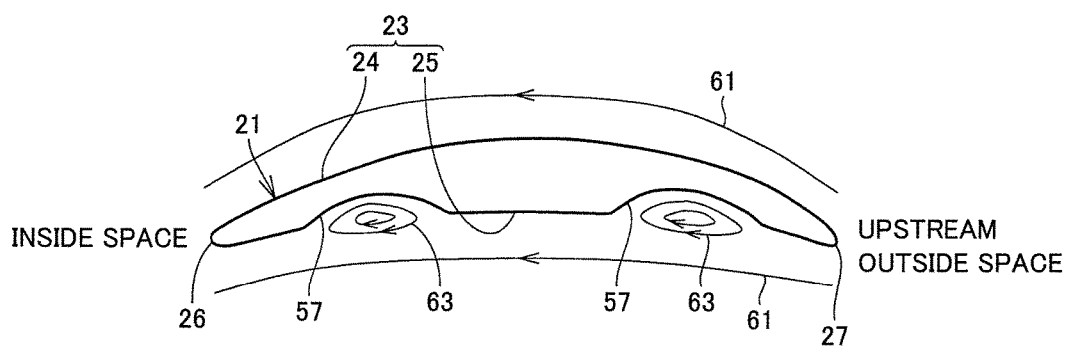
FIG. 7 is a cross-sectional view representing a phenomenon that occurs on a blade surface of the fan blade in an upstream region shown in FIG. 5.
Figure 8:
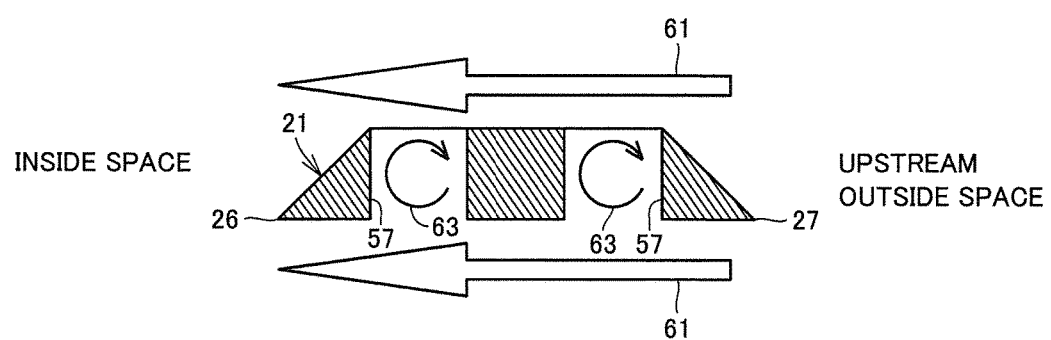
FIG. 8 is a diagram schematically representing the fan blade shown in FIG. 7.

FIG. 7 is a cross-sectional view representing a phenomenon that occurs on the blade surface of the fan blade in the upstream region shown in FIG. 5. FIG. 8 is a diagram schematically representing the fan blade shown in FIG. 7.

Referring to FIG. 7 and FIG. 8, when an air flow directed from upstream outside space 146 toward inside space 147 is formed at upstream region 141, an air flow is produced on blade surface 23 of fan blade 21 to flow in from outer edge portion 27, pass through on blade surface 23, and flow out from inner edge portion 26. Here, a clockwise vortex 63 (secondary flow) of air flow is formed in concave portion 57 formed at pressure surface 25. Accordingly, a main flow 61 of air flow passing through on blade surface 23 flows along the outside of vortex 63 produced at concave portion 57.

Figure 9:
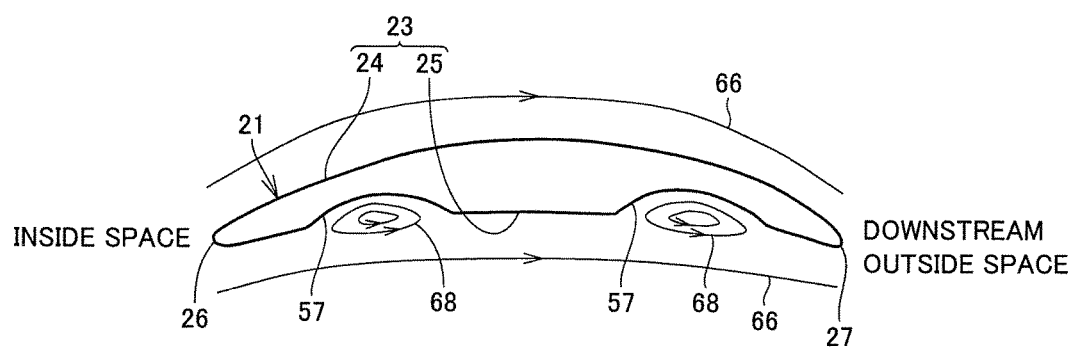
FIG. 9 is a cross-sectional view representing a phenomenon that occurs on the blade surface of the fan blade in a downstream region shown in FIG. 5.
Figure 10:
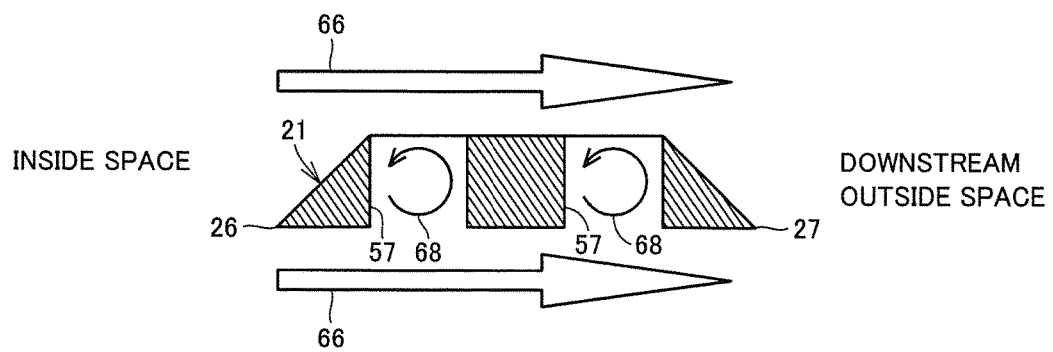
FIG. 10 is a diagram schematically representing the fan blade shown in FIG. 9.

FIG. 9 is a cross-sectional view representing a phenomenon that occurs on the blade surface of the fan blade in the downstream region shown in FIG. 5. FIG. 10 is a diagram schematically representing the fan blade shown in FIG. 9.

Referring to FIG. 9 and FIG. 10, when an air flow directed from inside space 147 toward downstream outside space 148 is formed in downstream region 142, an air flow is produced on blade surface 23 of fan blade 21 to flow in from inner edge portion 26, pass through on blade surface 23, and flow out from outer edge portion 27. Here, a counterclockwise vortex 68 (secondary flow) of air flow is formed at concave portion 57 formed at pressure surface 25. Accordingly, a main flow 66 of air flow passing through on blade surface 23 flows along the outside of vortex 68 produced at concave portion 57.

In other words, in cross-flow fan 10, when fan blade 21 moves from upstream region 141 to downstream region 142, the direction of air flow on blade surface 23 is reversed, and the rotation direction of the vortex produced at concave portion 57 is reversed accordingly.

In cross-flow fan 10 in the present embodiment, although having a thin blade cross-sectional shape, fan blade 21 exhibits a behavior like a thick blade as if the blade cross-sectional shape is increased in thickness by the depth of the concave portion 57 at which a vortex (secondary flow) is formed. As a result, the lift produced at fan blade 21 can be significantly increased. Concave portions 57 are formed in the proximity of inner edge portion 26 and outer edge portion 27. Accordingly, the effect as described above achieved by concave portions 57 is brought about in the proximity of inner edge portion 26 and outer edge portion 27, thereby generating a high lift.

In cross-flow fan 10 in this manner, the vortex of air flow formed in the concave portion has a function of reducing friction drag between the main flow and blade surface 23. The friction drag between the main flow and blade surface 23 is greater at pressure surface 25 than at suction surface 24. In the present embodiment, therefore, concave portions 57 are formed at pressure surface 25 to reduce the friction drag between the main flow and pressure surface 25. On the other hand, there is a concern that if a vortex of air flow is formed in the concave portion, the main flow strips off starting from the vortex. The concern that the main flow strips off is more likely to be generated at suction surface 24 than at pressure surface 25. In the present embodiment, therefore, no concave portion is formed at suction surface 24 thereby reliably preventing stripping off of the main flow.

The effect of reducing the friction drag and the effect of preventing stripping off of the main flow as described above will be more specifically described below.

Considering a general scale and a general flow rate of a cross-flow fan, the Reynolds number of the air flowing between adjacent fan blades 21 of the cross-flow fan is relatively small in a region of Re=$10^3$ to $10^4$. In this region, the viscosity of the air is extremely large relative to inertia (that is, viscous fluid), and the friction drag between the air forming the main flow between fan blades 21 and blade surface 23 increases. More specifically, it is beneficial to reduce the friction drag between the main flow and blade surface 23 in order to enhance the efficiency of the cross-flow fan. Then, in cross-flow fan 10 in the present embodiment, a secondary flow that is not the main flow of air flow is formed in concave portion 57 formed in blade surface 23 to obtain a vortex rotating in concave portion 57, thereby reducing the friction drag between the main flow and blade surface 23.

Such a mechanism can be readily understood from the situation in which a huge stone is carried using logs. In this situation, the logs are used as "rollers" to provide a function of reducing the friction drag between the huge stone and the ground. In cross-flow fan 10 in the present embodiment, the ground is replaced by blade surface 23, the huge stone is replaced by the air with high viscosity (main flows 61, 66), and the logs are replaced by vortexes 63, 68 formed in concave portions 57. More specifically, in the present embodiment, vortexes 63, 68 formed in concave portions 57 function as logs thereby reducing the friction drag between main flows 61, 66 and blade surface 23.

The friction drag between main flow 61, 66 and blade surface 23 is such that pressure surface 25 side>>negative surface 24 side for the reasons described below.

Since pressure surface 25 is formed on the rotation direction side of cross-flow fan 10, main flow 61, 66 is strongly pressed against pressure surface 25 during rotation of fan blades 21. As a result, the friction drag between main flow 61, 66 and blade surface 23 is increased. By contrast, suction surface 24 is arranged on the side opposite to the rotation direction of cross-flow fan 10. Therefore, during rotation of fan blades 21, a force is exerted on suction surface 24 in the direction in which main flow 61, 66 goes away (is stripped) from blade surface 23. As a result, the friction drag between main flow 61, 66 and blade surface 23 is reduced. In cross-flow fan 10 in the present embodiment, concave portions 57 are formed at pressure surface 25, considering that the friction drag between main flow 61, 66 and blade surface 23 is increased at pressure surface 25.

By contrast, on the suction surface 24 side, a force is exerted in the direction in which main flow 61, 66 is stripped from blade surface 23 as described above. This is particularly significant when the pressure loss is great in the air channel upstream of cross-flow fan 10, thereby causing a concern that main flow 61, 66 on the suction surface 24 side strips off from blade surface 23. If such stripping occurs, fan blade 21 cannot fulfill the function as a blade, resulting in poor energy savings. In addition, noise is increased by turbulence caused by the stripping. On the other hand, there is a concern that a vortex formed in the concave portion promotes the stripping starting from the vortex. Then, in cross-flow fan 10 in the present embodiment, no concave portion is formed at suction surface 24.

Even when a concave portion is formed at suction surface 24, the number of concave portions formed at suction surface 24 is set smaller than the number of concave portions formed at pressure surface 25, whereby the effect of reducing the friction drag (merit) and the risk of stripping (demerit) are well balanced on the suction surface 24 side.

In cross-flow fan 10 in the first embodiment of the present invention configured in this manner, the lift produced with rotation of fan blade 21 can be significantly increased in the low Reynolds number region applied to a fan for home electric equipment, etc. Accordingly, power consumption for driving cross-flow fan 10 can be reduced.

In air conditioner 110 in the first embodiment of the present invention, the use of cross-flow fan 10 having an excellent blowing capacity reduces power consumption of a driving motor for driving cross-flow fan 10. Accordingly, it is possible to obtain air conditioner 110 that can contribute to energy savings.

Although an air conditioner has been described by way of example in this embodiment, the cross-flow fan in the present invention is also applicable to a fluid feeding device such as, for example, an air purifier, a humidifier, a cooling device, and a ventilating device.

Second Embodiment

In the present embodiment, a variety of modifications of cross-flow fan 10 in the first embodiment will be described.

Figure 11:
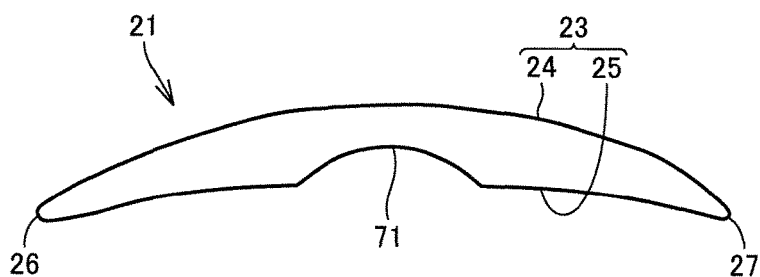
FIG. 11 is a cross-sectional view of a first modification of the cross-flow fan in FIG. 1.

FIG. 11 is a cross-sectional view of a first modification of the cross-flow fan in FIG. 1. Referring to FIG. 11, fan blade 21 has a blade cross-sectional shape as a whole in which the thickness is relatively small at positions adjacent to inner edge portion 26 and outer edge portion 27 and the thickness gradually increases toward the blade central portion between inner edge portion 26 and outer edge portion 27.

In this modification, fan blade 21 has a blade cross-sectional shape in which a concave portion 71 is formed at pressure surface 25 of blade surface 23. Concave portion 71 is formed to be positioned at the blade central portion between inner edge portion 26 and outer edge portion 27. Concave portion 71 is formed so as to include a position on pressure surface 25 where the distance from inner edge portion 26 and the distance from outer edge portion 27 are equal.

With such a configuration, a vortex (secondary flow) of air flow is formed in concave portion 71, whereby the air flow (main flow) passing through blade surface 23 flows along the outside of the vortex produced in concave portion 71. This results in the effect of suppressing the stripping of the airflow at the blade central portion, and fan blade 21 can exhibit a stable capacity as a blade.

Figure 12:
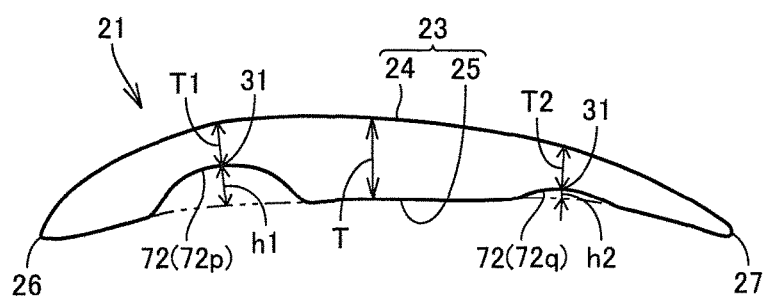
FIG. 12 is a cross-sectional view of a second modification of the cross-flow fan in FIG. 1.

FIG. 12 is a cross-sectional view of a second modification of the cross-flow fan in FIG. 1. Referring to FIG. 12, in this modification, thickness T of fan blade 21 is greatest at a position nearer to inner edge portion 26, as one of inner edge portion 26 and outer edge portion 27, between inner edge portion 26 and outer edge portion 27. Fan blade 21 has a blade cross-sectional shape as a whole in which the thickness is relatively large at a position adjacent to inner edge portion 26 and the thickness gradually decreases toward outer edge portion 27 via the blade central portion between inner edge portion 26 and outer edge portion 27.

Fan blade 21 has a blade cross-sectional shape in which concave portions 72 are formed at pressure surface 25 of blade surface 23. A plurality of concave portions 72 (concave portion 72p and concave portion 72q) are formed at pressure surface 25. Concave portions 72 are formed in the proximity of inner edge portion 26 and outer edge portion 27. More specifically, concave portion 72p is formed in the proximity of inner edge portion 26, and concave portion 72q is formed in the proximity of outer edge portion 27. Concave portions 72 are formed such that thickness T1 of fan blade 21 at a position where concave portion 72p is formed and thickness T2 of fan blade 21 at a position where concave portion 72q is formed are equal to each other. Depth h1 of concave portion 72p is greater than depth h2 of concave portion 72q.

With such a configuration, in air conditioner 110 shown in FIG. 5, a high lift can be produced in particular when fan blade 21 passes through downstream region 142. When it is necessary to enhance the blowing capacity in downstream region 142, for example, when a member as a drag to the blowing air is arranged in downstream region 142, more appropriate and efficient blowing performance can be achieved.

Conversely to the manner shown in FIG. 12, fan blade 21 may have a blade cross-sectional shape as a whole in which the thickness is relatively large at a position adjacent to outer edge portion 27 and the thickness gradually decreases toward inner edge portion 26 via the blade central portion between inner edge portion 26 and outer edge portion 27. In this case, for the same reason as described above, the suitable effect can be achieved in particular when it is necessary to enhance the blowing capacity in upstream region 141.

The cross-sectional shape of fan blade 21 as a whole is not limited to the manners described in the first embodiment and the first and second modifications, but may be formed in other manners.

Figure 13:
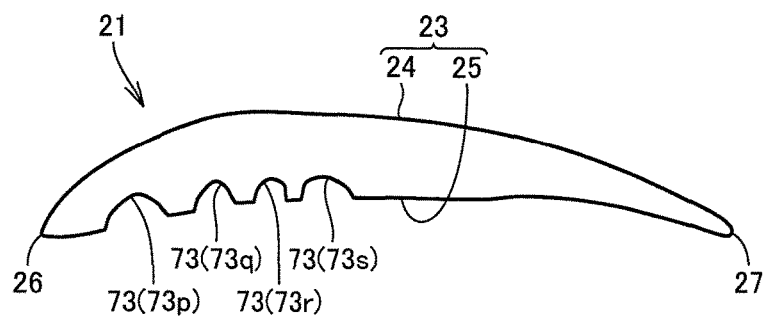
FIG. 13 is a cross-sectional view of a third modification of the cross-flow fan in FIG. 1.
Figure 14:
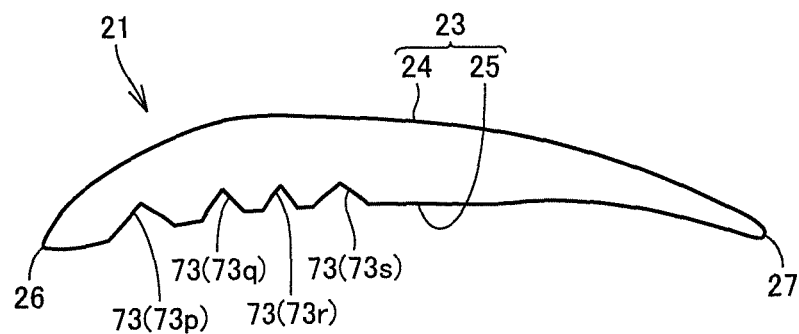
FIG. 14 is a cross-sectional view of a fourth modification of the cross-flow fan in FIG. 1.
Figure 15:
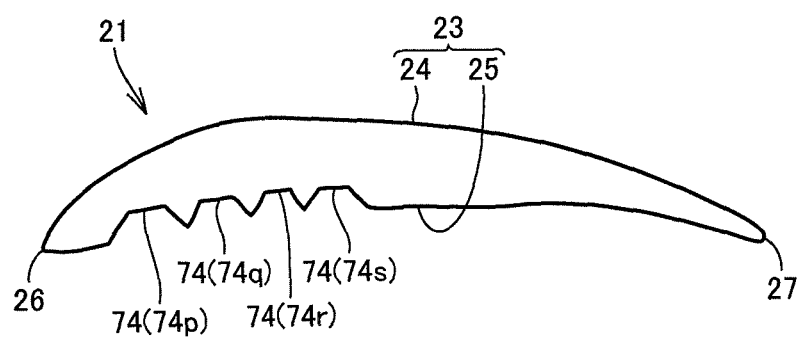
FIG. 15 is a cross-sectional view of a fifth modification of the cross-flow fan in FIG. 1.

FIG. 13 is a cross-sectional view of a third modification of the cross-flow fan in FIG. 1. FIG. 14 is a cross-sectional view of a fourth modification of the cross-flow fan in FIG. 1. FIG. 15 is a cross-sectional view of a fifth modification of the cross-flow fan in FIG. 1.

Referring to FIG. 13 to FIG. 15, fan blade 21 has a blade cross-sectional shape as a whole in which the thickness is relatively large at a position adjacent to inner edge portion 26 and the thickness gradually decreases toward outer edge portion 27 via the blade central portion between inner edge portion 26 and outer edge portion 27.

Referring to FIG. 13 and FIG. 14, fan blade 21 has a blade-cross sectional shape in which concave portions 73 are formed at pressure surface 25 of blade surface 23. A plurality of concave portions 73 (concave portion 73*p*, concave portion 73*q*, concave portion 73*r*, and concave portion 73*s*) are formed at pressure surface 25. A plurality of concave portions 73 are formed to be positioned in the proximity of inner edge portion 26. In the modification shown in FIG. 13, concave portion 73 has an approximately U-shaped groove cross section. In the modification shown in FIG. 14, concave portion 73 has an approximately V-shaped groove cross section.

Referring to FIG. 15, fan blade 21 has a blade cross-sectional shape in which concave portions 74 are formed at pressure surface 25 of blade surface 23. A plurality of concave portions 74 (concave portion 74*p*, concave portion 74*q*, concave portion 74*r*, and concave portion 74*s*) are formed at pressure surface 25. A plurality of concave portions 74 are formed to be positioned in the proximity of inner edge portion 26. Concave portion 74 has an approximately trapezoidal groove cross section. Concave portion 74 is formed to have a flat portion at the bottom thereof. A plurality of concave portions 74 are arranged to be continuous such that pressure surface 25 is not formed between adjacent concave portions 74. The side surface of the groove cross section of concave portion 74 (for example, concave portion 74*p*) is directly connected with the side surface of the groove cross section of concave portion 74 (for example, concave portion 74*q*) adjacent to the above-noted concave portion 74.

As shown in the foregoing modifications, a plurality of, namely, three or more concave portions 73, 74 may be formed at pressure surface 25. Concave portions 73, 74 may have a variety of groove cross-sectional shapes. When the groove cross sections shown in FIGS. 13 and 14 are compared with the groove cross section shown in FIG. 15, the vortex formed in concave portion 73 is more protuberant from blade surface 23 in the groove cross sections shown in FIGS. 13 and 14, which are shaped to rise from the point where the depth of concave portion 73 is greatest, toward opposite sides thereof. In this case, the main flow of the air flow flows outside of the protuberant vortex, so that the effect of a thick blade can be achieved more effectively.

Third Embodiment

In the present embodiment, a molding die for use in production of cross-flow fan 10 in FIG. 1 will be described.

Figure 16:
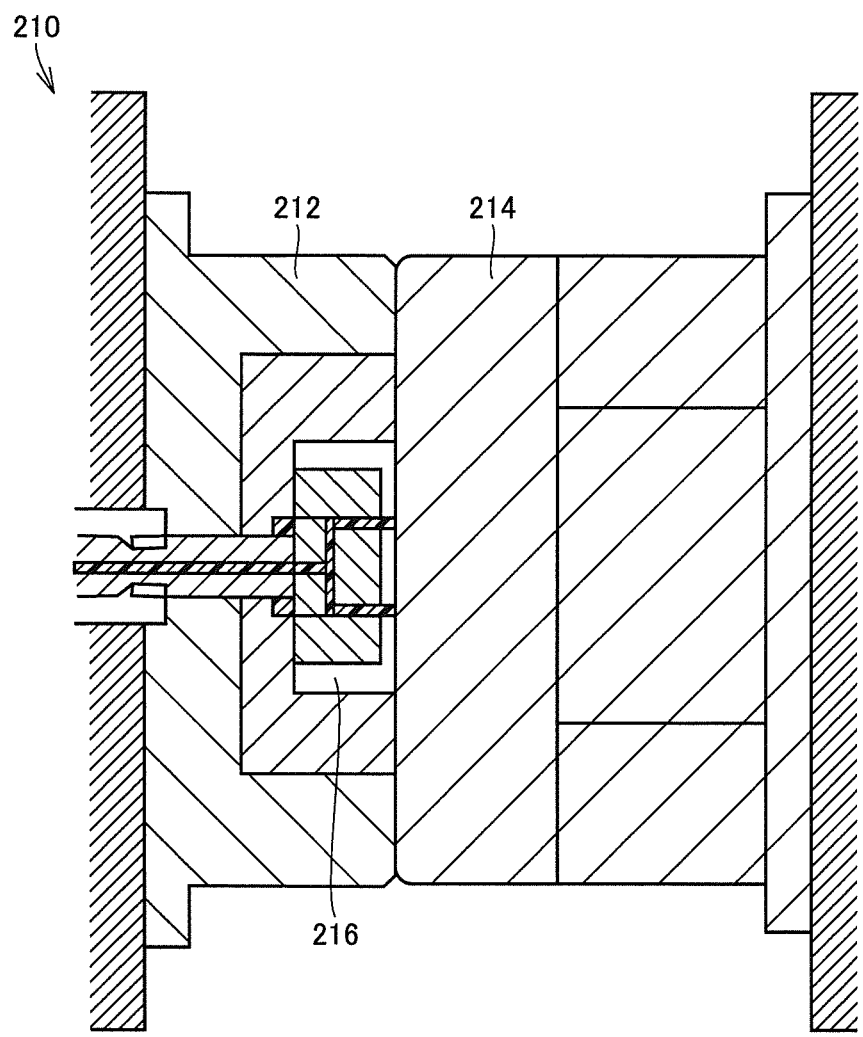
FIG. 16 is a cross-sectional view of a molding die for use in production of the cross-flow fan in FIG. 1.

FIG. 16 is a cross-sectional view of a molding die for use in production of the cross-flow fan in FIG. 1. Referring to FIG. 16, a molding die 210 has a stationary die 214 and a movable die 212. Stationary die 214 and movable die 212 define a cavity 216 which has approximately the same shape as cross-flow fan 10 and into which flowable resin is injected.

Molding die 210 may be provided with a not-shown heater for increasing the flowability of resin injected into cavity 216. The installation of such a heater is particularly effective, for example, when synthetic resin with an increased strength, such as glass-fiber-filled AS resin, is used.

With molding die 210 configured in this manner, a cross-flow fan having a blade cross-sectional shape with a high drag-lift ratio, with a small thickness and weight, and with a high strength can be manufactured by resin molding.

Fourth Embodiment

In the present embodiment, each of cross-flow fan 10 shown in FIG. 1 and a cross-flow fan for comparison having a fan blade without a concave portion in blade surface 23 is mounted in air conditioner 110 shown in FIG. 4. Each example carried out using that air conditioner 110 will be described.

In the example described below, cross-flow fan 10 and the cross-flow fan for comparison each having a diameter of 100 mm and a length of 600 mm were used, where the shape including the size and arrangement of fan blade 21 was the same except for the presence/absence of the concave portion.

Figure 17:
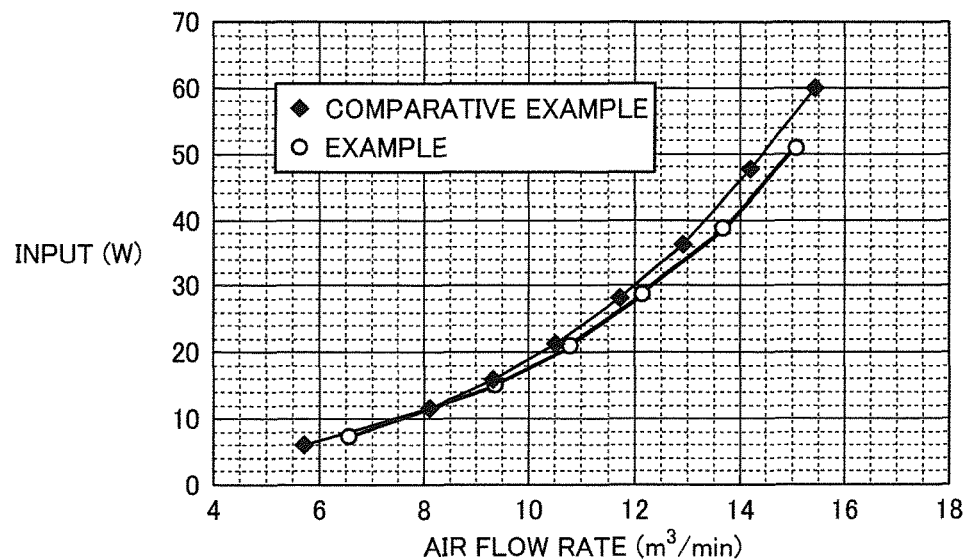
FIG. 17 is a graph showing the relation between the air flow rate of the cross-flow fan and power consumption of a driving motor in an example of the present invention.

FIG. 17 is a graph showing the relation between the air flow rate of the cross-flow fan and the power consumption of a driving motor in the example. Referring to FIG. 17, in the example, the power consumption of the driving motor was measured at various air flow rates, in each of the case using cross-flow fan 10 and the case using the cross-flow fan for comparison. As a result of measurement, it was confirmed that as compared with the cross-flow fan for comparison, cross-flow fan 10 reduced power consumption of the driving motor at the same flow rate.

Figure 18:
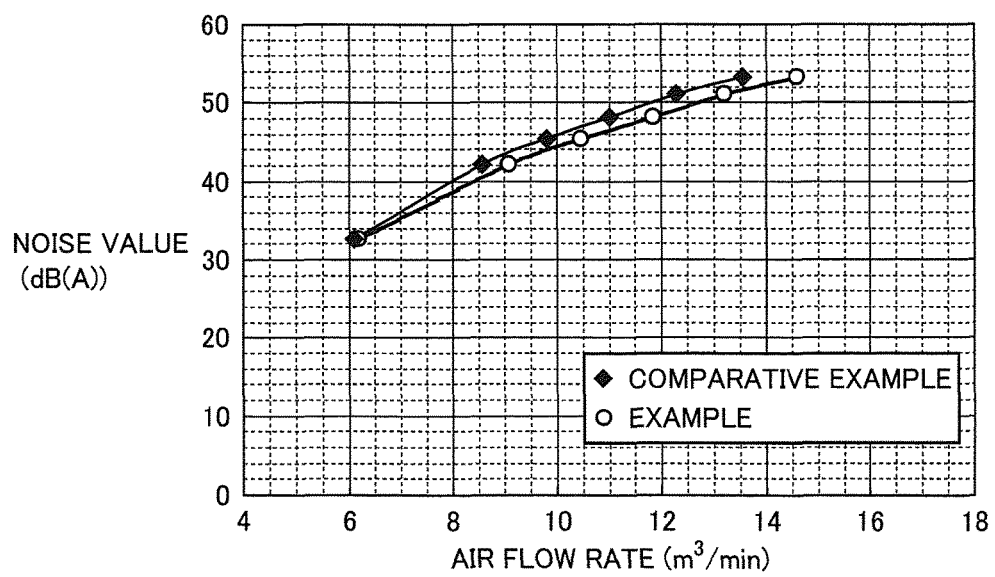
FIG. 18 is a graph showing the relation between the air flow rate of the cross-flow fan and noise value in the example.

FIG. 18 is a graph showing the relation between the air flow rate of the cross-flow fan and noise value in the example. Referring to FIG. 18, in the example, the noise value was measured at various air flow rates, in each of the case using cross-flow fan 10 and the case using the cross-flow fan for comparison. As a result of the measurement, it was confirmed that as compared with the cross-flow fan for comparison, cross-flow fan 10 reduced the noise value at the same flow rate.

Figure 19:
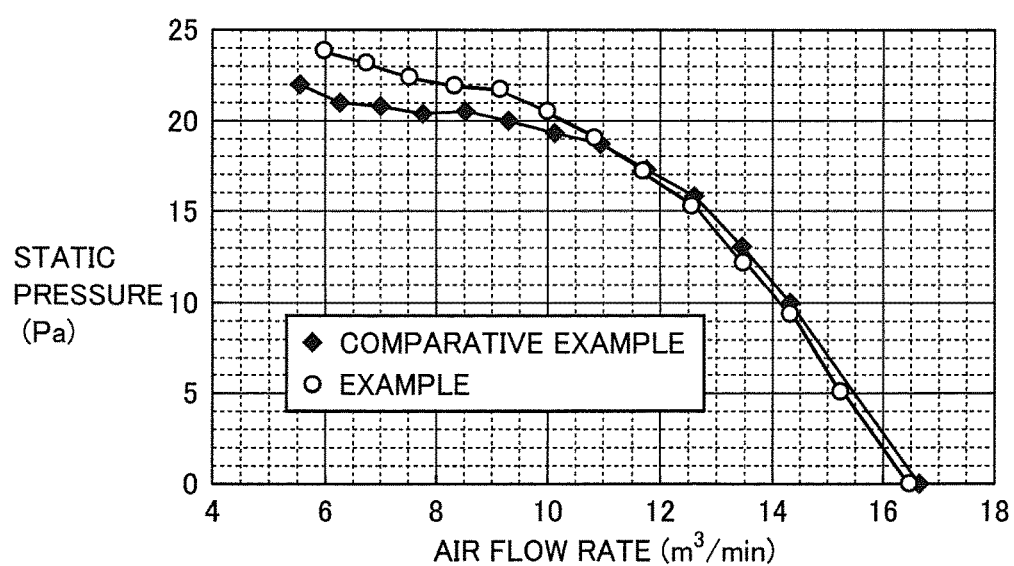
FIG. 19 is a graph showing pressure-flow rate characteristics of the cross-flow fan in the example.

FIG. 19 is a graph showing pressure-flow rate characteristics of the cross-flow fan in the example. The figure shows the pressure-flow rate characteristics (P: static pressure-Q: air flow rate) of cross-flow fan 10 and the cross-flow fan for comparison at a constant rotation speed. Referring to FIG. 19, cross-flow fan 10 improved in the P-Q characteristics specifically in a small air flow rate region, as compared with the cross-flow fan for comparison.

The structures of the cross-flow fan as described in the foregoing first and second embodiments may be combined as appropriate to form a new cross-flow fan. The molding die and the fluid feeder described in the first and third embodiments are applicable to a variety of cross-flow fans described in the first and second embodiments and to a cross-flow fan formed of a combination thereof.

The embodiment disclosed here should be understood as being illustrative rather than being limitative in all respects. The scope of the present invention is shown not in the foregoing description but in the claims, and it is intended that all modifications that come within the meaning and range of equivalence to the claims are embraced here.

INDUSTRIAL APPLICABILITY

The present invention is mainly applied to home electric equipment having an air blowing function, such as an air purifier and an air conditioner.

REFERENCE SIGNS LIST 10 cross-flow fan, 12, 12A, 12B impeller, 13 peripheral frame, 13a, 13b end surface, 21 fan blade, 23 blade surface, 24 suction surface, 25 pressure surface, 26 inner edge portion, 27 outer edge portion, 31 point, 41, 41A, 41B flection portion, 57, 57p, 57q, 71, 72, 72p, 72q, 73, 73p, 73q, 73r, 73s, 74, 74p, 74q, 74r, 74s concave portion, 61, 66 air flow, 63, 68, 162 vortex, 101 center axis, 106 center line, 110 air conditioner, 115 blower, 120 indoor unit, 122 casing, 122A cabinet, 122B front panel, 124 intake port, 125 outlet port, 126 air flow channel, 128 air filter, 129 indoor heat exchanger, 131 horizontal louver, 132 vertical louver, 141 upstream region, 142 downstream region, 146 upstream outside space, 147 inside space, 148 downstream outside space, 151 front wall portion, 152 rear wall portion, 153, 154 protrusion portion, 156 upper guide, 157 lower guide, 210 molding die, 212 movable die, 214 stationary die, 216 cavity.

The invention claimed is:

1. A cross-flow fan comprising:
a plurality of impellers aligned in an axial direction of a rotation axis of said cross-flow fan, and
a peripheral frame between each of said plurality of impellers that are adjacent to each other, wherein
each of said plurality of impellers includes a plurality of vane portions circumferentially spaced apart from each other and supported by said peripheral frame,
each of said plurality of vane portions includes an inner edge portion on a radially inner side to/from which air flows in/out, and an outer edge portion on a radially outer side to/from which air flows in/out,
each of said plurality of vane portions includes a blade surface extending between said inner edge portion and said outer edge portion, a pressure surface on a rotation direction side of the cross-flow fan, and a suction surface on a back side of said pressure surface,
when cut along a plane orthogonal to said rotation axis of the cross-flow fan, each of said plurality of vane portions includes a blade cross-sectional shape in which a first concave portion and a second concave portion are concave from said pressure surface,
said first concave portion is between said inner edge portion and said outer edge portion at a first position closer to said inner edge portion than to a blade central portion, and said second concave portion is between said inner edge portion and said outer edge portion at a second position closer to said outer edge portion than to said blade central portion,
said blade cross-sectional shape has a blade thickness that increases from said inner edge portion toward said blade central portion and that increases from said outer edge portion toward said blade central portion,
the blade thickness at a point where a depth of the first concave portion is greatest is equal to the blade thickness at a point where a depth of the second concave portion is greatest, and
said pressure surface extends to be continuously curved: (i) between said inner edge portion and said first concave portion, (ii) between said first concave portion and said second concave portion, and (iii) between said second concave portion and said outer edge portion.

2. The cross-flow fan according to claim 1, wherein
said first concave portion has a first groove cross section extending along the rotation axis of the cross-flow fan, and said second concave portion has a second groove cross section extending along said rotation axis of the cross-flow fan,
a first side surface of said first groove cross section rises from a first point where a depth of said first concave portion is greatest on both sides of said first point, and
a second side surface of said second groove cross section rises from a second point where a depth of said second concave portion is greatest on both sides of said second point.

3. The cross-flow fan according to claim 1, wherein
said vane portion has a first flection portion and a second flection portion formed by convex portions of a center line of said blade cross-sectional shape extending between said inner edge portion and said outer edge portion, and
said first concave portion is formed at said first flection portion, and said second concave portion is formed at said second flection portion.

4. The cross-flow fan according to claim 1, wherein said first concave portion and said second concave portion extend from one end to another end of said blade surface in the axial direction of the rotation axis of the cross-flow fan.

5. The cross-flow fan according to claim 1, wherein the cross-flow fan is formed from resin.

6. A fluid feeder comprising:
a blower including the cross-flow fan of claim 1, and
a driving motor coupled to said cross-flow fan to rotate a plurality of said vane portions.

* * * * *